Patented June 22, 1954

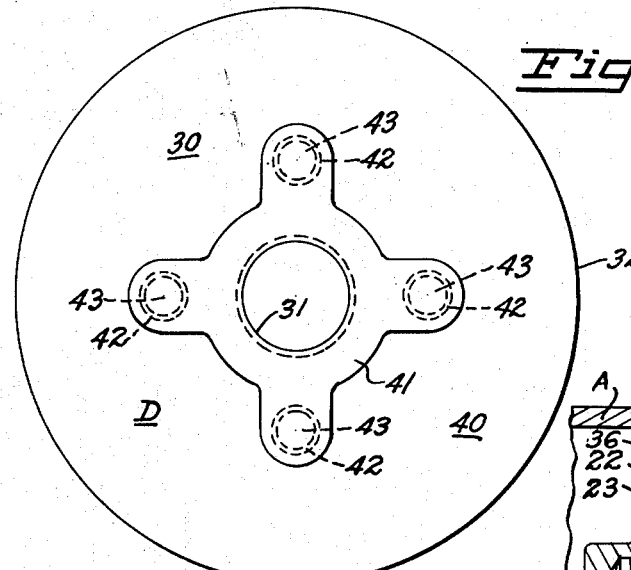
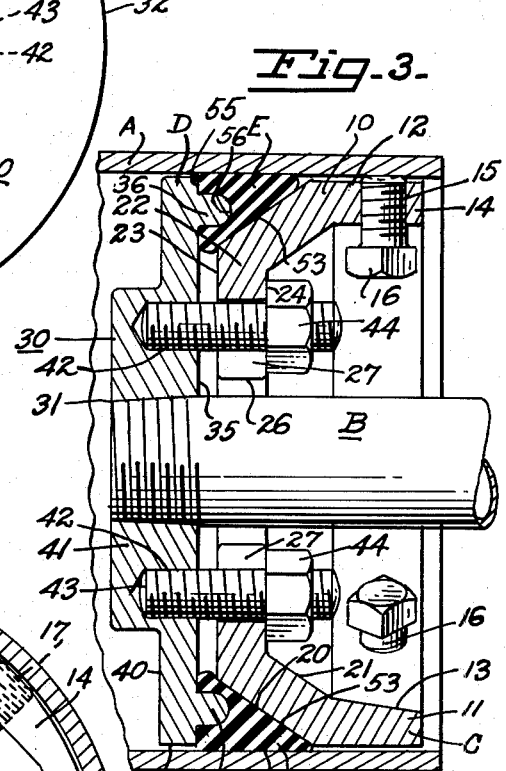

2,681,816

UNITED STATES PATENT OFFICE 2,681,816

ADAPTER FOR CONNECTING PIPES TO LARGER THREADLESS PIPES

Telford L. Smith, South San Francisco, Calif.

Application November 22, 1949, Serial No. 128,758

2 Claims. (Cl. 285—183)

This invention relates to an improved fitting for joining together in axial alignment two pipes having different diameters.

The invention solves the problem in axially aligned pipes of how to attach a small-diameter pipe to a large-diameter pipe. It is especially useful where the large-diameter pipe has no internal threading, like the cast-iron water-main pipe that is made with bell-and-spigot joints. Heretofore there has been no suitable leak-proof fitting that can be installed by an unskilled laborer. Heretofore, making this type of attachment has been a job for a skilled plumber.

This invention solves these problems by providing a reduction fitting which:

(1) Will fit in the open end of an unthreaded pipe;

(2) Will keep water from leaking out where the pipes are joined;

(3) Will keep any outside contaminating material from seeping into the pipe;

(4) Will seal more tightly as the pressure increases;

(5) Can be installed by an unskilled laborer and with no tool but a wrench; and (6) Will not be moved out of place even when the fluid pressure reaches substantial proportions.

The invention also provides a novel type of sealing gasket for use in a reduction fitting.

In general, the invention comprises a three-piece fitting used to join a smaller pipe to the end of a larger pipe. Its three pieces are:

(1) A plug body which is held in the end of the larger pipe by radially-extending bolts;

(2) An inner pressure member which is secured to the body on the side that faces the pressure and has an opening in which the smaller pipe can be threaded; and (3) A resilient diaphragm or gasket compressed between the body and the pressure member. The gasket prevents leakage in or out around the fitting.

The plug body may be positioned in the larger pipe by means of its radially-extending bolts. The pressure member may then be drawn toward the body by mechanical means. As the rubber diaphragm is squeezed between the two metal members, its outer periphery expands until it effects a tight seal against the walls of the larger pipe. The smaller pipe may then be threaded into the pressure member.

When liquid flows through the pipes, there will be no leakage. Any increase in hydrostatic pressure simply adds to the snubbing and sealing action of the rubber ring. The higher the water pressure in the pipe, the greater the compression and the greater the sealing action of the gasket. In fact, when the fitting is set to its full hydromechanical adjustment, the strength of the seal will exceed the strength of the pipe. Because the seal is so tight, the fitting seals out contamination as well as seals in the hydrostatic pressure.

Each fitting may be used to fit several variations of pipe sizes simply by using various sized gaskets. The fitting can be used over and over again. Its use completely obviates the need for leading or caulking. There is no need for welding. No special equipment is required for its installation, and it is free from multiple-lugs, chains, wedges, clamps and other unnecessary gadgets.

Other advantages and objects of the invention will appear from the following detailed description of a fitting embodying the invention. The description, given in accordance with United States Revised Statutes, Section 4888, is not, however, intended to narrowly limit the claims that define the scope of the invention.

In the drawings:

Fig. 1 is a view in front elevation of one type of fitting embodying the principles of the invention.

Fig. 2 is a view in rear elevation of the same; it shows the fitting installed in a pipe.

Fig. 3 is a view in section along the line 3—3 in Fig. 2.

Fig. 4 is an enlarged view in section of a portion of Fig. 3; it shows a portion of the gasket and the parts adjacent to it at a time before the gasket has been compressed into the shape shown in Fig. 3.

The fitting shown in the drawings joins together in axial alignment a larger pipe A and a smaller pipe B. The fitting includes a body C, a pressure member D, and a resilient gasket E between the body and the pressure member.

Preferably the body C and pressure member D are made from a non-rusting alloy, such as bronze or aluminum; and the gasket E is preferably made from rubber or synthetic rubber. The gasket may be tapered to fit against a tapered face on the body C. It may also be recessed to fit around a circular bead on the face of the pressure member D (Figs. 1 to 4).

When the three pieces C, D, and E are secured together loosely, they may be placed inside the end of the pipe A. The members C and D may then be compressed toward each other, so as to expand the gasket E until its outer periphery seals very tightly against the wall of the pipe A. The smaller pipe B is then threaded into an opening in the pressure member D.

In the invention, shown in Figs. 1 to 4, the body C is a cup-shaped metal member or plug 10. It has an annular rim 11 with a round outer periphery 12 just small enough so that the body 10 may fit easily in the end of the pipe A. Its inner periphery 13 is generally round, except for chords 14, which provide thickened portions in the rim 11 and give it more strength where it is pierced by its several radial taps 15. When bolts 16 are threaded through the taps 15, they extend out radially and may engage the walls of the pipe A. Preferably the bolts 16 have cupped or dished ends 17, which bite into the walls of the pipe A and hold the body 10 more firmly in place. A six-inch fitting of this type has successfully withstood a 550 pound water pressure without the bolts being forced to move along the pipe wall.

The outer and inner faces of the plug 10 are preferably tapered at 20 and 21, respectively, toward a web 22 at the bottom of the cup 10. The web 22 preferably has a flat outer face 23, a flat inner face 24, and a central opening 25 that extends all the way through. The opening 25 is complex; it includes a central circular portion 26 somewhat wider than the outside diameter of the smaller pipe B and a plurality of recesses 27 around the edge of the portion 26; these recesses 27 being adapted to receive the stud bolts 43 of the pressure member 30 (described below).

The pressure member D is a generally disc-shaped member or plate 30 with a central threaded opening 31 in which the pipe B may be threaded. Its outside periphery 32 is approximately the same as the periphery 12 of the body 10.

The inner face 35 of the pressure member 30 (the one which faces toward the body 10) is preferably flat except for a round-surfaced annular bead 36. The opposite, outer face 40 may be bossed at 41 over a central area similar in shape to the opening 25, but larger. Opposite the bossed area 41, the face 35 may be tapped at 42, the taps 42 being spaced like the recesses 27 and adapted to have studs 43 threaded into them.

The diaphragm or gasket E comprises an annular rubber or synthetic rubber member 50 positioned between the face 35 of the plate 30 and the tapered face 20 of the plug 10. Before the gasket is compressed (see below), its outer periphery 51 has about the same dimensions as the body 10 and pressure member 30. (See Fig. 4.) Its inner periphery 52 will lie at about the inner end of the body's tapered face 20.

A tapered face 53 of the gasket fits on the plug's tapered face 20, and preferably terminates in a stub end 54. The opposite face 55 of the gasket 50 is molded to provide an annular groove 56 which mates with the bead 36; preferably, the groove 56 is somewhat shallower than the bead 36.

To assemble and use the fitting of Figs. 1 to 4, the gasket 50 is first placed against the pressure member 30 by mating the groove 56 and bead 36. Then the tapered face 20 of the body 10 is placed against the tapered face 53 of the gasket 50. The studs 43 from the pressure member 30 then extend through the recesses 27, and nuts 44 may be threaded on them tightly enough to hold the three-piece fitting together, but not tight enough to compress the gasket 50. (See Fig. 4.) The bolts 16 may be inserted in the taps 15 if they are not already in place, but their cupped ends 17 should not at this time project out beyond the periphery 12.

The fitting is inserted into the open end of the pipe A with the bossed face 40 of the pressure member 30 leading (so that it faces the water pressure). The cupped bowl of the body 10 will then face the outside open end of the pipe A. The bolts 16 are then tightened, and they bite into the wall of the pipe A and hold the fitting in position.

Next the nuts 44 are tightened against the inside cup bottom 24. This pulls the pressure member 30 toward the body 10 and compresses the gasket 50. The gasket's tapered face 20 is confined by the body 10 and cannot expand. Soon the entire face 55 will abut the pressure member 30, and the gasket 50 cannot expand any more in that direction. Further compression will then cause the faces 51, 52, and 54 to expand outwardly. The effect of this expansion is to force the wide outer edge 51 tightly against the walls of pipe A and make the fitting leak-tight. (See Fig. 3.)

The sealing action is enhanced by the water pressure. The water in pipe A flows against the bossed face 40 of the pressure member 30; its pressure urges the pressure member 30 toward the body 10.

After the nuts 44 are tightened, the smaller pipe B may be threaded into the opening 31. The pipe B is then joined to the larger pipe A, and the area between the pipe B and the pipe A is effectually plugged.

This embodiment typifies the principles of the invention and provides a leak-tight, fool-proof, reduction fitting which an unskilled laborer can safely and easily insert in place.

I claim:

1. A quick detachable coupling for a pair of axially aligned pipes of widely different diameters, comprising an outer cup-shaped body member having a radial bolt carrying rim adapted to be secured within the larger diameter pipe, a disk-like wall having a central aperture for passage therethrough of the pipe of smaller diameter and a plurality of radial slots communicating with said aperture, and an intermediate annular connecting rim portion having an inwardly inclined gasket engaging surface, said coupling further including a pressure member having a centrally apertured second wall portion opposite said first wall portion, a gasket engaging rim portion, and a pair of threaded diametrically opposite guide studs projecting outwardly from said second wall portion and extending through and closely fitting within a pair of radial slots in said first wall portion, an annular gasket having surfaces engageable with said rim portions and the inner wall of the larger diameter pipe, and a pressure applying nut threaded on each of said studs portion and engaging said first wall portion adjacent said central aperture and pipe of smaller diameter for drawing said wall portions toward each other and compressing said gasket against the inner wall of the larger diameter pipe.

2. The coupling as defined in claim 1, wherein said first wall portion has a plurality of uniformly spaced radial slots communicating with the central opening therein, a threaded guide stud projecting through each of said slots, and a pressure applying nut threaded on each stud and engaging said first wall adjacent said central aperture.

References Cited in the file of this patent

UNITED STATES PATENTS

| Number | Name | Date |
|---|---|---|
| 402,600 | Kemp | May 7, 1889 |
| 449,169 | O'Brien | Mar. 31, 1891 |
| 848,493 | Redenbaugh | Mar. 26, 1907 |
| 986,297 | Kinkade | Mar. 7, 1911 |
| 1,077,352 | Kemp et al. | Nov. 4, 1913 |
| 1,178,145 | Florence | Apr. 6, 1916 |
| 1,536,025 | Lamb et al. | Apr. 28, 1925 |
| 2,475,748 | Leroy | July 12, 1949 |